United States Patent [19]

Neidospial, Jr. et al.

[11] Patent Number: 5,295,578
[45] Date of Patent: Mar. 22, 1994

[54] SINGLE-PIECE PROTECTIVE PACKAGE FOR A FILM CASSETTE

[75] Inventors: John J. Neidospial, Jr., Prrinceton Junction, N.J.; Mark D. Fraser, Hamlin; Christopher P. McCormick, Rochester, both of N.Y.

[73] Assignee: Eastman Kodak Company, Rochester, N.Y.

[21] Appl. No.: 40,945

[22] Filed: Mar. 31, 1993

[51] Int. Cl.⁵ .................... B65D 85/671; B65D 81/30
[52] U.S. Cl. ...................................... 206/408; 206/389
[58] Field of Search .................... 206/316.1, 389, 397, 206/407–411, 415, 416; 242/71.1, 71.7; 354/275

[56] References Cited

U.S. PATENT DOCUMENTS

| | | | |
|---|---|---|---|
| 3,490,578 | 1/1970 | Speakman | 206/409 |
| 4,179,028 | 12/1979 | Stemme et al. | 206/389 |
| 4,801,011 | 1/1989 | Desdoigts et al. | 206/389 |
| 4,887,113 | 12/1989 | Niedospial, Jr. | 354/275 |
| 4,913,368 | 4/1990 | Atkinson | 242/71.1 |
| 4,948,063 | 8/1990 | Niedospial, Jr. | 242/71.1 |
| 5,004,176 | 4/1991 | Niedospial | 242/71.1 |

*Primary Examiner*—Jimmy G. Foster
*Attorney, Agent, or Firm*—Roger A. Fields

[57] ABSTRACT

A single-piece protective package is intended for a film cassette provided with a substantially cylindrical housing having an extending pair of lips slightly spaced apart to define a film egress/ingress mouth and with a rotatable film spool for a coiled filmstrip inside the housing having a protruding end that protrudes at least to an outside end face of the housing to permit its engagement to rotate the film spool. The package comprises a mouth cap configured to fit over the extending pair of lips of the housing including the film egress/ingress mouth to seal the film egress/ingress mouth, but not to fit over a cylindrical portion of the housing to leave the cylindrical portion visible, and spool locking means integrally formed with the mouth cap for engaging the protruding end of the film spool to prevent rotation of the film spool when the mouth cap is fit over the extending pair of lips of the housing.

8 Claims, 4 Drawing Sheets

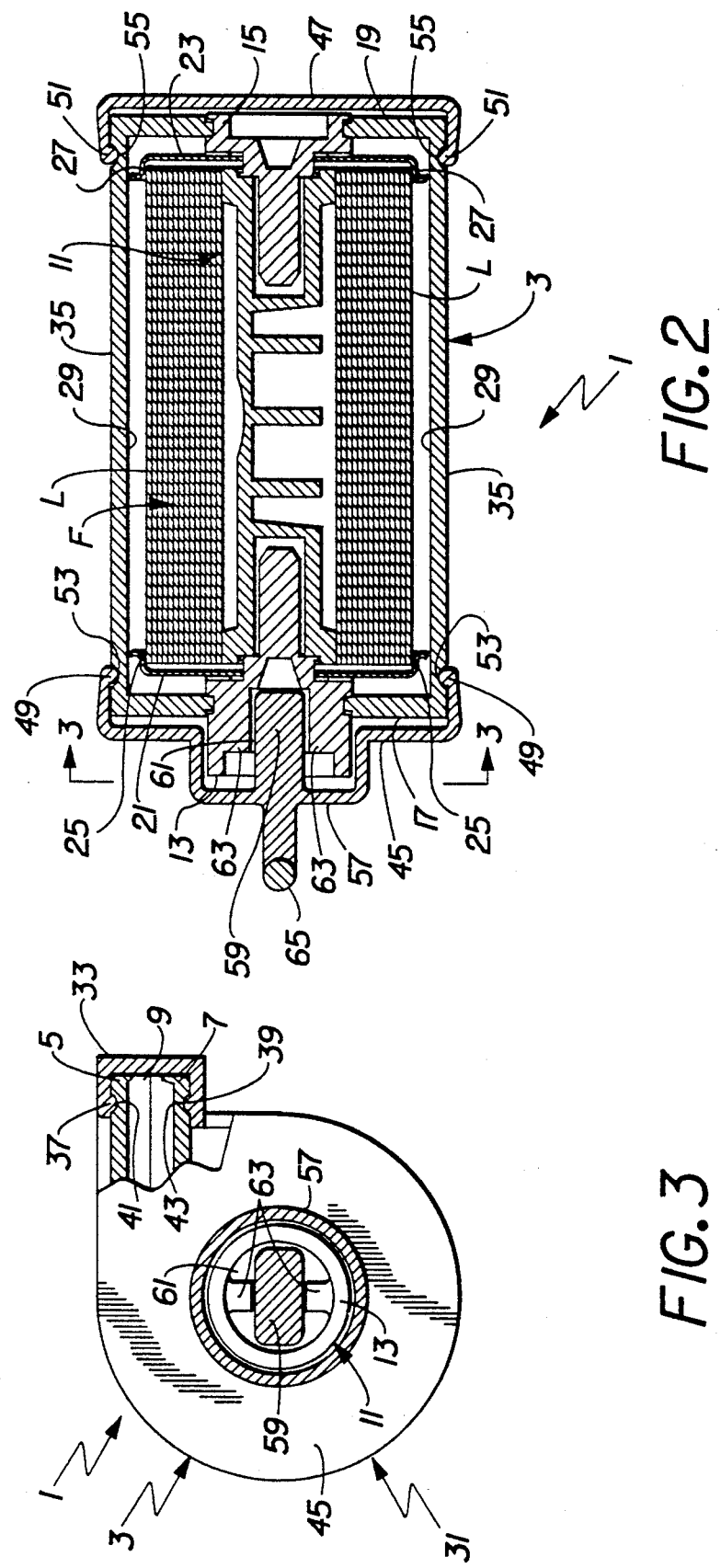

SINGLE-PIECE PROTECTIVE PACKAGE FOR A FILM CASSETTE

BACKGROUND OF THE INVENTION

1. Field of the Invention

The invention relates generally to the field of photography, and in particular to protective packages for film cassettes.

2. Description of the Prior Art

Film manufacturer's cassettes containing 35 mm film are well known. Traditionally, a film cassette comprises a lighttight substantially cylindrical housing having an extending pair of lips slightly spaced apart to define a film egress/ingress mouth or slit, and a rotatable film spool for a coiled filmstrip inside the housing having two protruding spool ends that protrude at least to respective exterior end faces of the housing. One of the protruding spool ends is intended to be engaged in a camera, for example, by a rotational driver or a spindle, to rotate and/or support the film spool. When the film spool is rotated in a winding direction, the filmstrip will be wound onto the film spool. If, however, the film spool is rotated in an unwinding direction, the filmstrip will tend to expand radially against an inside curved wall of the housing until a friction-binding between the film roll and the inside wall is effected which prevents further spool rotation in the unwinding direction. Thus, in the traditional cassette the filmstrip must be pulled from the housing.

More recently, as disclosed in commonly assigned U.S. Pat. Nos. 4,948,063, issued Aug. 14, 1990, in the name of John J. Niedospial, and 5,004,176, issued Apr. 2, 1991 in the name of John J. Niedospial, there has been proposed a film cassette that is capable of propelling the filmstrip from the housing responsive to unwinding rotation of the film spool. In this new cassette, it is no longer necessary to pull the filmstrip from the housing.

Typical containers for storing the film cassettes prior to use comprise a black plastic cylindrical can for loosely containing holding the cassette and a similar snap-on lid for covering an open end of the can.

PROBLEMS TO BE SOLVED BY THE INVENTION

Prior art containers for storing film cassettes are rather bulky with respect to the cassettes, and therefore require substantial room for storage.

Also, the film spool is free to rotate within the housing of the film cassette when the cassette is stored in the container.

SUMMARY OF THE INVENTION

According to the invention, a single-piece protective package for a film cassette provided with a substantially cylindrical housing having an extending pair of lips slightly spaced apart to define a film egress/ingress mouth and with a rotatable film spool for a coiled filmstrip inside the housing having a protruding end that protrudes at least to an outside end face of the housing to permit its engagement to rotate the film spool, is characterized by:

a mouth cap configured to fit over the extending pair of lips of the housing including the film egress/ingress mouth to seal the film egress/ingress mouth, but not to fit over a cylindrical portion of the housing to leave the cylindrical portion visible; and spool locking means integrally formed with the mouth cap for engaging the protruding end of the film spool to prevent rotation of the film spool when the mouth cap is fit over the extending pair of lips of the housing.

BRIEF DESCRIPTION OF THE DRAWINGS

FIG. 2 is a sectional view of the package and the film cassette shown in FIG. 1;

FIG. 3 is a sectional view of the package and the film cassette as viewed in the direction of the arrows 3,3 in FIG. 2;

DETAILED DESCRIPTION OF THE PREFERRED AND EMBODIMENTS

Preferred Embodiment

Figure 1:
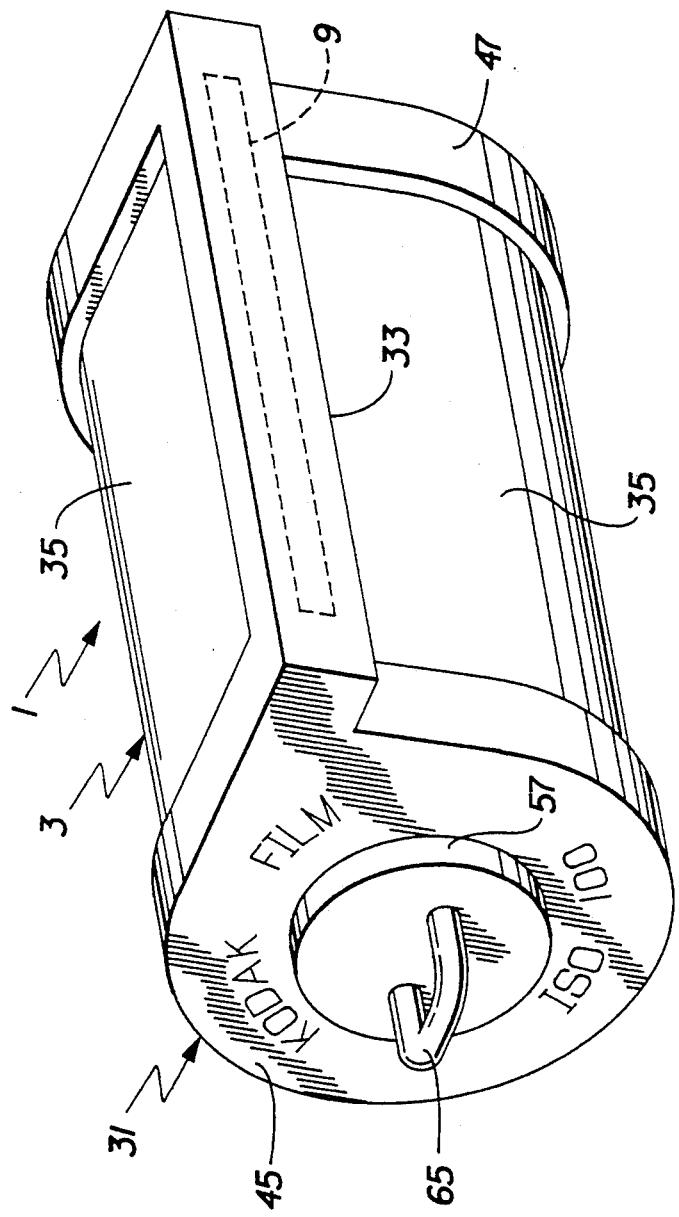
FIG. 1 is a perspective view of a single-piece package for a film cassette according to a preferred embodiment of the invention, showing the package fit over a film cassette of the type disclosed in commonly assigned U.S. Pat. Nos. 4,948,063 and 5,004,176.

Referring now to the drawings, FIGS. 1-3 show a film cassette 1 of the type disclosed in commonly assigned U.S. Pat. Nos. 4,948,063 and 5,004,176. These two commonly assigned patents are incorporated into this application. The film cassette 1 comprises a substantially cylindrical housing 3 having an extending pair of lips 5 and 7 slightly spaced apart to define a film egress/ingress mouth or slit 9, and a rotatable film spool 11 for a coiled filmstrip F inside the housing. The film spool 11 has two protruding spool ends 13 and 15, one of which protrudes beyond an outside end face 17 of the housing 3 and the other of which protrudes to an outside end face 19 of the housing. As described in much greater detail in the two patents, a pair of flexible flanges 21 and 23 are coaxially rotatably mounted on the film spool 11 to radially confine a film leader L of the filmstrip F within respective skirted peripheries 25 and 27 of the two flanges to prevent the leader from substantially contacting an inside curved wall 29 of the housing 3. A film stripper, not shown, projects from the inside wall 29 to be received between a free leading end, not shown, of the leader L and the next inward convolution of the film roll to free the leader from the radial confinement of the two flanges 21 and 23 and guide the leader outwardly through the film egress/ingress mouth 9, responsive to rotation of the film spool 11 in an unwinding direction. The stripper frees the leader L from the flanges 21 and 23 by inducing the leader (which is stiffer widthwise than the flanges are flexible) to flex the flanges farther apart at their skirted peripheries 25 and 27 during unwinding rotation of the film spool 11. Thus, in contrast to a conventional 35 mm film cassette, the film cassette 1 is capable of propelling the leader L from the housing 3 when the film spool 11 is rotated in an unwinding direction.

A single-piece protective package 31 for the film cassette 1, constructed of resilient plastic material such as polyethylene, is shown in FIGS. 1–3. The package 31 includes a mouth cap 33 configured to snugly fit over the two lips 5 and 7 to seal the film egress/ingress mouth 9, but not to fit over a cylindrical portion 35 of the housing 3 to leave a major part of the housing visible. See FIG. 1. Preferably, two protuberances 37 and 39 are provided on inner surfaces of the mouth cap 33 to mate with respective cavities 41 and 43 in outer surfaces of the lips 5 and 7 to releaseably secure the mouth cap to the lips. See FIG. 3. Respective end covers 45 and 47 integrally formed with the mouth cap 33 are configured to snugly fit over the two outside end faces 17 and 19 of the housing 3 when the mouth cap is fit over the film egress/ingress mouth 9. See FIGS. 1 and 2. Preferably, respective protuberances 49 and 51 are provided on inner surfaces of the end covers 45 and 47 to mate with two cavities 53 and 55 in outer surfaces of the housing 3 to releaseably secure the end covers to the housing. See FIG. 2. The end cover 45 includes a centered end cap 57 configured to snugly fit over the protruding spool end 13 as shown in FIG. 2. A spool locking tab 59 projects from an inner surface of the end cap 57 to be positioned in a centered cavity 61 in the protruding spool end 13 between a pair of opposing spline extensions 63 from the protruding spool end, to engage the spool end to prevent rotation of the film spool 11. See FIGS. 2 and 3. The end cap 57 includes a hook 65 engageable to suspend the package 31 with the film cassette 1. As shown in FIG. 1, film-related indicia may be imprinted on the end cover 45.

First Alternate Embodiment

Figure 4:
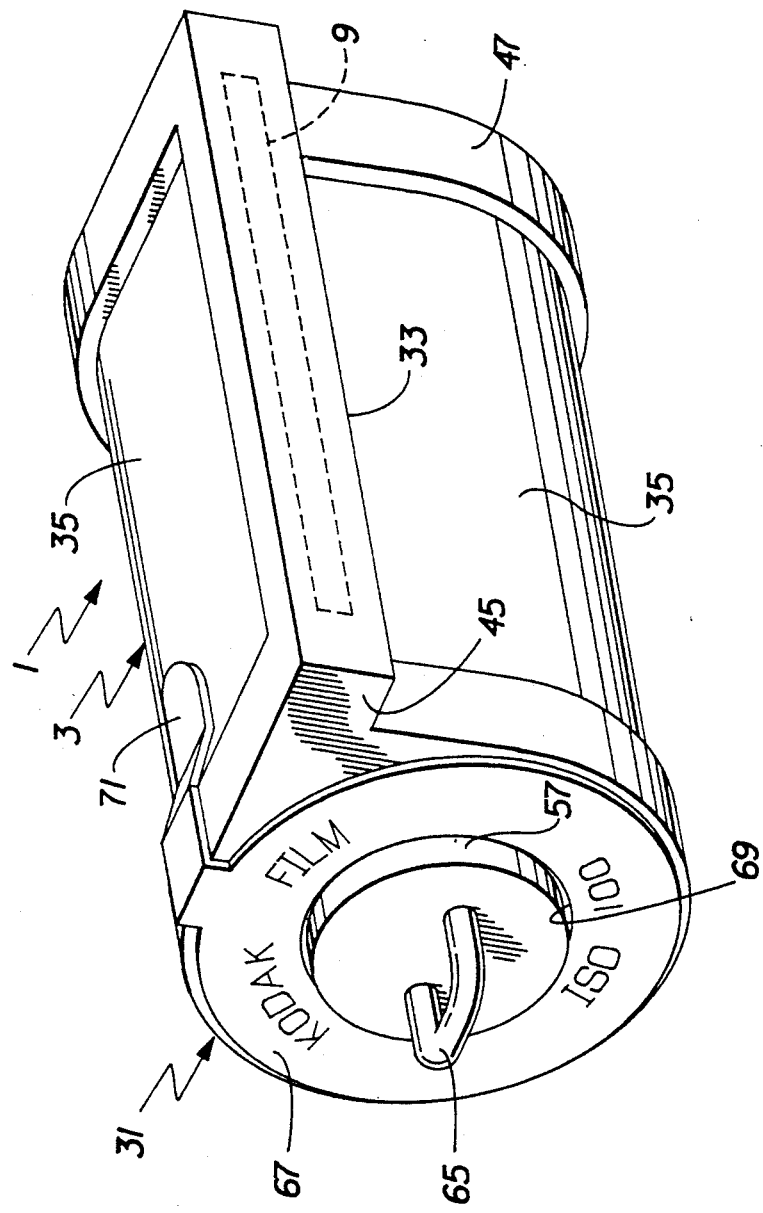
FIG. 4 is a perspective view of a first alternate embodiment of the package shown in FIG. 1.

As shown in FIG. 4, instead of imprinting film-related indicia on the end cover 45, a removable annular label 67 with film-related indicia may be used. The annular label 67 is configured to fit over the end cover 45, and has a central opening 69 for receiving the end cap 57 and a resilient catch 71 for releaseably securing the label to the end cover.

Second Alternate Embodiment

Figure 5:
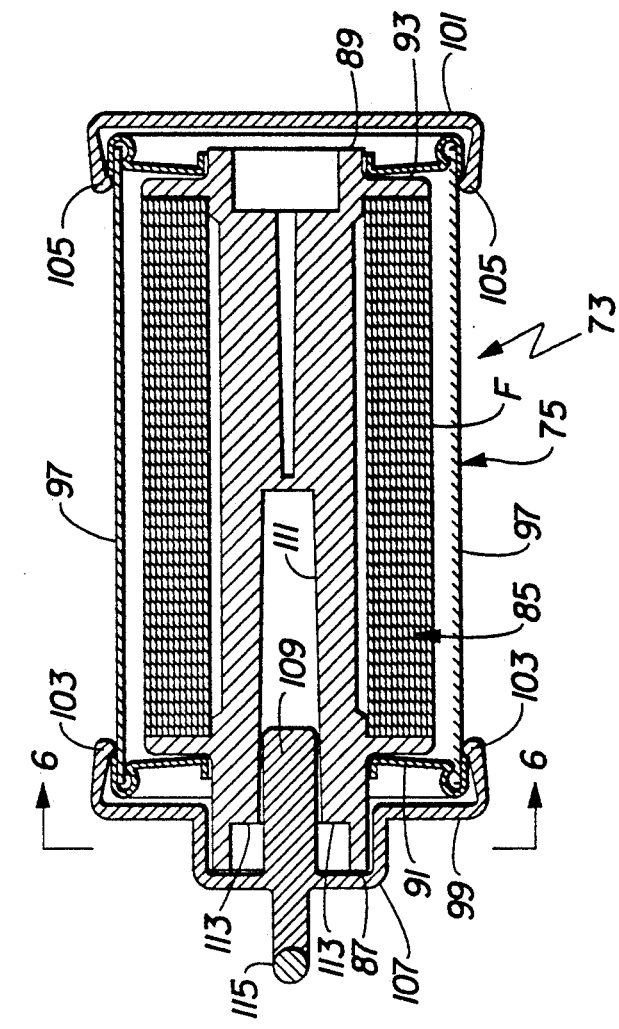
FIG. 5 is a sectional view of a second alternate embodiment of the package shown with a conventional 35 mm film cassette in place of the film cassette depicted in FIGS. 1-4.
Figure 6:
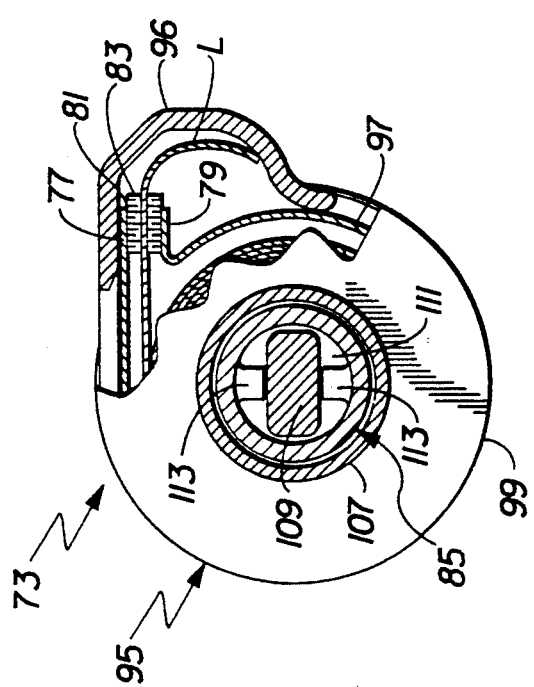
FIG. 6 is a sectional view of the package and the film cassette as viewed in the direction of the arrows 6,6 in FIG. 5.

FIGS. 5 and 6 show a conventional film manufacturer's 35 mm film cassette 73 comprising a substantially cylindrical housing 75 having an extending pair of lips 77 and 79 slightly spaced apart to define a film egress/ingress mouth or slit 81 from which slightly protrudes light-trapping plush 83, and a rotatable film spool 85 for a coiled filmstrip F inside the housing. The filmstrip F has a film leader L that normally protrudes from the housing 75 at the film egress/ingress mouth 81. The film spool 85 has two protruding spool ends 87 and 89, one of which protrudes beyond an outside end face 91 of the housing 75 and the other of which protrudes to an outside end face 93 of the housing.

A single piece protective package 95 for the film cassette 73, constructed of resilient plastic material such as polyethylene, is shown in FIGS. 5 and 6. The package 95 includes a bulging mouth cap 96 configured to enclose the two lips 77 and 79 to seal the film egress/ingress mouth 81, but not to fit over a cylindrical portion 97 of the housing 75 to leave a major part of the housing visible. Respective end covers 99 and 101 integrally formed with the mouth cap 96 are configured to snugly fit over the two outside end faces 91 and 93 of the housing 75 when the mouth cap is fit over the film egress/ingress mouth 81. Preferably, respective protuberances 103 and 105 are provided on inner surfaces of the end covers 99 and 101 to releaseably secure the end covers to the housing 75 as shown in FIG. 5. The end cover 99 includes a centered end cap 107 configured to snugly fit over the protruding spool end 87 as shown in FIG. 5. A spool locking tab 109 projects from an inner surface of the end cap 107 to be positioned in a centered cavity 111 in the protruding spool end 87 between a pair of opposing spline extensions 113 from the protruding spool end, to engage the spool end to prevent rotation of the film spool 85. See FIGS. 5 and 6. The end cap 107 includes a hook 115 engageable to suspend the package 95 with the film cassette 73.

The invention has been described with reference to preferred and alternate embodiments. However, it will be appreciated that various modifications can be effected by persons of ordinary skill in the art without departing from the scope of the invention.

Parts List for FIGS. 1–6

1. film cassette
3. cassette housing
5 & 7. housing lips
9. film egress/ingress mouth
11. film spool
13 & 15. spool ends
17 & 19. housing end faces
21 & 23. flanges
L. film leader
F. filmstrip
25 & 27. skirted peripheries
29. housing inside wall
31. protective package
33. mouth cap
35. housing cylindrical portion
37 & 39. protuberances
41 & 43. cavities
45 & 47. end covers
49 & 51. protuberances
53 & 55. cavities
57. centered end cap
59. spool locking tab
61. centered cavity
63. opposing spline extensions
65. hook
67. annular label
69. central opening
71. resilient catch
73. film cassette
75. housing
77 & 79. lips
81. film egress/ingress mouth
83. light-trapping plush
85. film spool
87 & 89. spool ends
91 & 93. housing end faces
95. protective package
96. mouth cap
97. housing cylindrical portion
99 & 101. end covers
103 & 105. protuberances
107. centered end cap
109. spool locking tab
111. centered cavity
113. opposing spline extensions
115. hook

We claim:

1. A single-piece protective package for a film cassette provided with a substantially cylindrical housing having an extending pair of lips slightly spaced apart to define a film egress/ingress mouth and with a rotatable film spool for a coiled filmstrip inside the housing having a protruding end that protrudes at least to an outside end face of the housing to permit its engagement to rotate the film spool, is characterized by:

a mouth cap configured to fit over the extending pair of lips of the housing including the film egress/ingress mouth to seal the film egress/ingress mouth, but not to fit over a cylindrical portion of the housing to leave the cylindrical portion visible; and spool locking means integrally formed with said mouth cap for engaging the protruding end of the film spool to prevent rotation of the film spool when said mouth cap is fit over the extending pair of lips of the housing.

2. A single-piece protective package as recited in claim 1, wherein an end cap integrally formed with said spool locking means is configured to fit over the protruding end of the film spool when the spool locking means engages the protruding end.

3. A single-piece protective package as recited in claim 1, wherein an end cover integrally formed with said mouth cap is configured to cover the outside end face of the housing when said mouth cap is fit over the extending pair of lips of the housing.

4. A single-piece protective package as recited in claim 3, wherein said end cover includes an end cap integrally formed with said spool locking means which is configured to fit over the protruding end of the film spool when the spool locking means engages the protruding end.

5. A single-piece protective package as recited in claim 4, wherein annular label means is configured to fit over said end cover and has a central opening for receiving said end cap.

6. A single-piece protective package as recited in claim 4, wherein said end cap includes hook means engageable to suspend said package.

7. A single-piece protective package as recited in claim 1, wherein said mouth cap has a contour that conforms substantially with the contour of the extending pair of lips of the housing.

8. A film package set comprising a film cassette provided with a substantially cylindrical housing having an extending pair of lips slightly spaced apart to define a film egress/ingress mouth and with a rotatable film spool for a coiled filmstrip inside said housing having a protruding end that protrudes at least to an outside end face of the housing to permit its engagement to rotate said film spool to move said filmstrip through said film egress/ingress mouth, and a single-piece protective package for said film cassette, is characterized in that:

said package has an integrally formed mouth cap fit over said extending pair of lips of the housing including said film egress/ingress mouth to seal the film egress/ingress mouth, but not fit over a cylindrical portion of the housing to leave said cylindrical portion visible, and integrally formed spool locking means engaging said protruding end of the film spool to prevent rotation of the film spool to move said filmstrip.

* * * * *